US010376782B2

(12) United States Patent
Umehara

(10) Patent No.: US 10,376,782 B2
(45) Date of Patent: Aug. 13, 2019

(54) GAME SERVER DEVICE, SERVER CONTROL METHOD, AND SERVER CONTROL PROGRAM

(71) Applicant: GREE, Inc., Tokyo (JP)

(72) Inventor: Kensuke Umehara, Tokyo (JP)

(73) Assignee: GREE, Inc., Tokyo (JP)

( * ) Notice: Subject to any disclaimer, the term of this patent is extended or adjusted under 35 U.S.C. 154(b) by 894 days.

(21) Appl. No.: 14/353,456

(22) PCT Filed: Oct. 26, 2012

(86) PCT No.: PCT/JP2012/077806
§ 371 (c)(1),
(2) Date: Apr. 22, 2014

(87) PCT Pub. No.: WO2013/062116
PCT Pub. Date: May 2, 2013

(65) Prior Publication Data

US 2014/0289324 A1 Sep. 25, 2014

(30) Foreign Application Priority Data

Oct. 28, 2011 (JP) ................................ 2011-238025

(51) Int. Cl.
*A63F 13/35* (2014.01)
*H04L 29/08* (2006.01)
(Continued)

(52) U.S. Cl.
CPC ............ *A63F 13/35* (2014.09); *A63F 13/795* (2014.09); *A63F 13/847* (2014.09);
(Continued)

(58) Field of Classification Search
CPC ...... A63F 13/35; A63F 13/795; A63F 13/847; A63F 13/87; A63F 2300/556; H04L 67/1051; H04L 67/42
See application file for complete search history.

(56) References Cited

U.S. PATENT DOCUMENTS

2005/0021159 A1 1/2005 Ogawa
2007/0265046 A1* 11/2007 Sato ........................ A63F 13/10 463/8
2008/0200226 A1* 8/2008 Ichimura ................ A63F 13/10 463/8

FOREIGN PATENT DOCUMENTS

JP 2005-34303 A 2/2005
JP 2008-142352 A 6/2008

OTHER PUBLICATIONS

International Search Report of corresponding PCT/JP2012/077806, dated Nov. 20, 2012, 2 pages.

(Continued)

*Primary Examiner* — Normin Abedin
(74) *Attorney, Agent, or Firm* — Oblon, McClelland, Maier & Neustadt, L.L.P.

(57) ABSTRACT

The server device according to the invention includes: a storage unit that associates and stores multiple first characteristic data sets for each user and associates and stores second characteristic data for each group to which the multiple first characteristic data sets belong; a different-user-selecting unit that selects a different user when a predetermined event occurs while a game is being played; a group formation-assessing unit that determines whether or not all of the first characteristic data sets belonging to a group are included in the first characteristic data sets associated with the user and the different user; and an action-executing unit that executes predetermined actions using, in addition to the first characteristic data sets associated with the user and the (Continued)

different user, the second characteristic data associated with the group for which it has been determined that all of the pertinent first characteristic data sets are included.

36 Claims, 7 Drawing Sheets

(51) Int. Cl.
*H04L 29/06* (2006.01)
*A63F 13/795* (2014.01)
*A63F 13/847* (2014.01)
*A63F 13/87* (2014.01)

(52) U.S. Cl.
CPC .......... *H04L 67/1051* (2013.01); *H04L 67/42* (2013.01); *A63F 13/87* (2014.09); *A63F 2300/556* (2013.01)

(56) References Cited

OTHER PUBLICATIONS

Kenka Bancho Zenkoku Seiha, Apuri STYLE, Jan. 1, 2011, vol. I, pp. 100 to 101, 5 pages.
English translation of Written Opinion for corresponding application No. PCT/JP2012/077806, dated Nov. 20, 2012, 8pp.
CROWS×WORST Saikyoudensetsu, FAMITSU.com, Internet <URL http://www.famitsu.com/news/201105/17043733.html>, published May 17, 2011, partial English translation, 4pp.

* cited by examiner

CARD DATA SET

| | |
|---|---|
| ENERGY | 100/100 |
| ATTACK POWER | 100/100 |
| DEFENSE POWER | 100/100 |
| . . . | . . . |

101

GROUP TABLE

| GROUP ID (202) | CARD (203) | ROBO CARD (204) |
|---|---|---|
| 1 | a, b, c, d, e | A |
| 2 | a, b, c, d, g | B |
| 3 | a, b, c, d, i | C |

201

GAME SERVER DEVICE, SERVER CONTROL METHOD, AND SERVER CONTROL PROGRAM

CROSS-REFERENCE TO RELATED APPLICATION(S)

This application is a National Phase Patent Application and claims priority to and the benefit of International Application Number PCT/JP2012/077806, filed on Oct. 26, 2012, which claims priority to Japanese Patent Application Number 2011-238025, filed on Oct. 28, 2011 the entire disclosures of which are incorporated herein by reference.

TECHNICAL FIELD

The present invention relates to a game server device, a server control method, and a server control program.

BACKGROUND ART

In recent years, a server device which provides a game via a network has spread. The game provided by the server device includes one in which a plurality of users can participate (a so-called "social game"), in which the users can not only battle and cooperate with each other but also communicate with each other (for example, refer to Patent Document 1).

However, such a game only allows users to cooperate with each other, etc., and there is not a game which can provide a synergetic effect beyond expectations and increase users' interest.

PRIOR ART DOCUMENT

Patent Document

Patent Document 1: Japanese Unexamined Patent Publication No. 2005-034303

SUMMARY OF INVENTION

Technical Problem

The present invention has been devised to overcome the above prior art problem, and an object of the invention is to provide a server device which can increase users' interest by way of a synergetic effect between users.

Solution to Problem

According to one embodiment, a server device is provided. The server device carries out a game in response to a request from a terminal device. The server device includes: a storage unit for storing, for each user, a characteristic data set usable by the user among a plurality of first characteristic data sets, in association with the user, each of the plurality of first characteristic data sets corresponding to data including a parameter indicating ability to execute a predetermined action, and storing, for each group to which at least two of the plurality of first characteristic data sets belong, a second characteristic data set in association with the group, the second characteristic data set corresponding to data including a parameter indicating ability to execute the predetermined action; a different-user-selecting unit for selecting, as a different user, at least one user who is different from a user of the terminal device, when a predetermined event occurs while the game is being carried out, the predetermined event requiring execution of the predetermined action; a group formation-assessing unit for extracting the first characteristic data sets associated with the user and the different user, by referring to the storage unit, and determining whether or not all the first characteristic data sets belonging to any one of the groups are included in the extracted first characteristic data sets; and an action-executing unit for extracting the second characteristic data set associated with the group for which the group formation-assessing unit has determined that all the first characteristic data sets belonging to the group are included, and executing the predetermined action by using the second characteristic data set in addition to the first characteristic data sets associated with the user and the different user.

Advantageous Effects of Invention

The server device according to the present invention can increase users' interest by a synergetic effect between users. Along with the increase in users' interest, users' wish to participate in the game is also expected to increase.

DESCRIPTION OF EMBODIMENTS (First Embodiment)

Hereinafter, with reference to the drawings, various embodiments will be described.

The server device according to the present embodiment carries out a game in response to a request from a terminal device. The terminal device requests the server device to carry out a game, in response to an instruction by a user, and receives a result obtained by carrying out the game, from the server device.

In this embodiment, the game carried out by the server device is a so-called card battle game using card data sets which are examples of characteristic data, including a parameter (or parameters) indicating ability to execute a predetermined action. In the card battle game, by using the card data sets, a user battles with enemies which are prepared in a game program and which appear as the game proceeds. Each user can possess an arbitrary number of card data sets. Each card data set includes parameters indicating the level, the attack power, the defense power, and the like, and the user can cause damage to each enemy according to the parameters. Each user can also call for cooperation to different users (each referred to as a "guest user" below). The user can use both the card data sets possessed by the user himself/herself and the card data sets possessed by the guest users.

At predetermined timing while the game is being carried out, an enemy appears as an example of an event which requires execution of a predetermined action. When an enemy appears, the server device performs event processing. Specifically, before performing battle processing, which is an example of a predetermined action, the server device selects one or more guest users and also extracts the card data sets possessed by the user and the guest users. For each card data set, a group is set to which the card data set belongs. When all the card data sets belonging to a predetermined group are included in the card data sets which are possessed by the user and the guest user and are to be used in the battle processing, the server device also extracts a card data set of a limited card for the group (referred to as a "robo card" below), to thereby enable a robo card data set to be used in the battle processing. In this way, the server device can enhance users' interest.

Figures 1, 2:
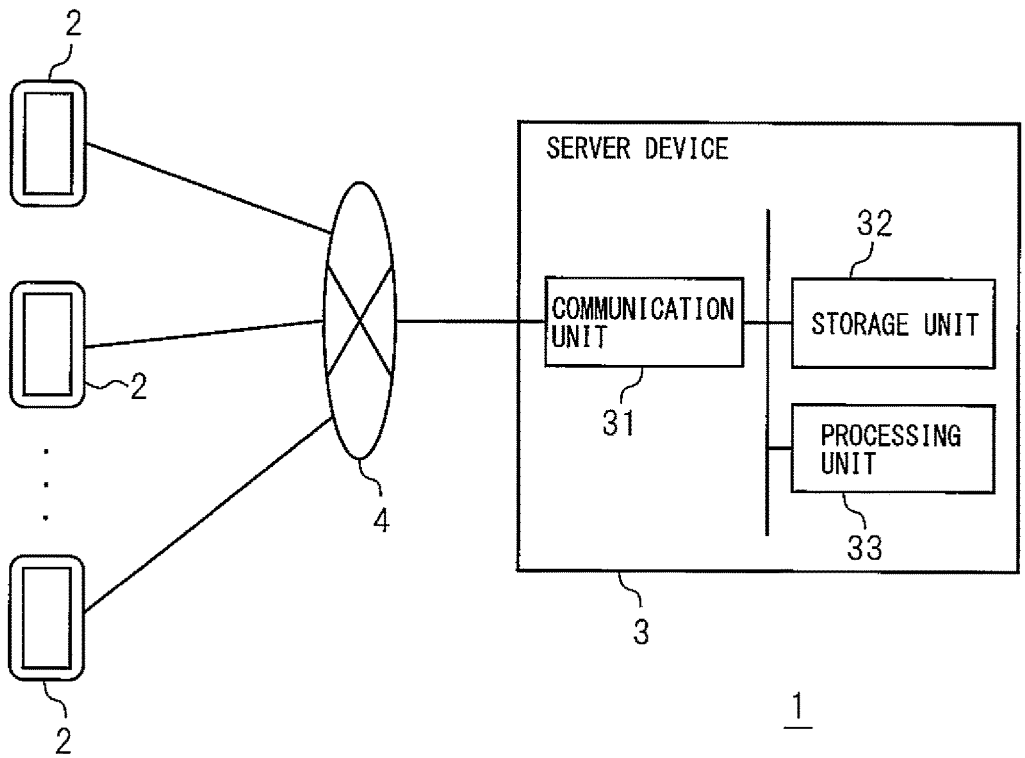
FIG. 1 is a schematic configuration diagram of a game system according to the first embodiment.
FIG. 2 is a schematic view illustrating an example of a card data set.

FIG. 1 is a schematic configuration diagram of a game system. As illustrated in FIG. 1, a game system 1 includes at least one terminal device 2, and a server device 3. The terminal device 2 and the server device 3 are connected to each other via a communication network 4 such as a public communication network or a wireless communication network, for example.

The terminal device 2 requests the server device 3 to carry out a game, in response to an operation (such as pressing of a button) by a user. The terminal device 2 also receives a result obtained by carrying out the game, from the server device 3. The terminal device 2 may be any device, as long as being capable of communicating with the server device 3, operating the game, and displaying a result obtained by carrying out the game. Examples of such a device are a so-called smartphone and feature phone, etc.

Figure 6A:
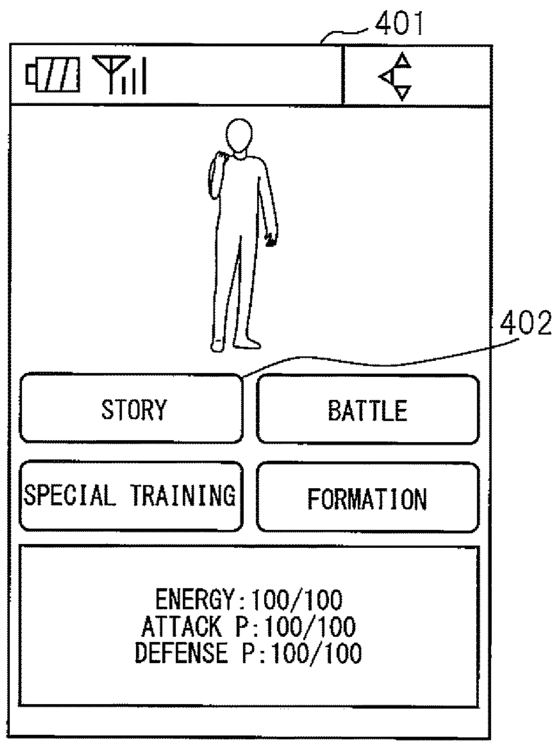
FIG. 6A is a schematic view illustrating an example of a display screen of the terminal device.

FIGS. 6A to 6D are schematic views illustrating examples of display screens of the terminal device 2. FIG. 6A illustrates a display screen 401 displayed before initiation of the game. An image of a user is displayed on an upper part of the display screen 401, while parameters of the cards possessed by the user are displayed on a lower part of the display screen 401. In addition, four buttons are displayed on a middle part of the display screen 401. According to an instruction provided via a "story" button 402, the terminal device 2 requests the server device 3 to carry out the game.

In response to the request from the terminal device 2, the server device 3 carries out a game. Moreover, when an enemy appears while the game is being carried out, the server device 3 performs the event processing. For the processing, the server device 3 includes a communication unit 31, a storage unit 32, and a processing unit 33.

The communication unit 31 includes a communication interface circuit for connecting the server device 3 to the communication network 4. The communication unit 31 transfers data received from the terminal device 2 via the communication network 4, to the processing unit 33. Moreover, the communication unit 31 transmits data received from the processing unit 33, to the terminal device 2 via the communication network 4.

The storage unit 32 includes at least one of a semiconductor memory, a magnetic disk device, and an optical disk device, for example. The storage unit 32 stores various programs and data to be used to control the server device 3. The storage unit 32 stores a program for carrying out the game and then outputting a result of the game, for example. Moreover, the storage unit 32 also stores a program for performing the event processing when an enemy appears while the game is being carried out. Furthermore, the storage unit 32 also stores a table representing the association of the identification number (ID) of each user and card data sets possessed by the user (referred to as a "user table" below), as well as a table representing the association of the ID of each group, card data sets belonging to the group, and the robo card data set of the group (referred to as a "group table" below). In addition, the storage unit 32 may also store temporary data related to predetermined processing.

FIG. 2 is a schematic view illustrating an example of a card data set. As illustrated in FIG. 2, the card data set includes parameters 101 indicating corresponding energy, attack power, defense power, and the like, image data to be used for display on a terminal device, and the like. Each user can possess multiple card data sets each including such data, and can determine as he/she desires how many and which data sets to allocate for a predetermined event (e.g., a deck for a battle).

In addition, the robo card data set also includes similar data.

Figures 3, 4:
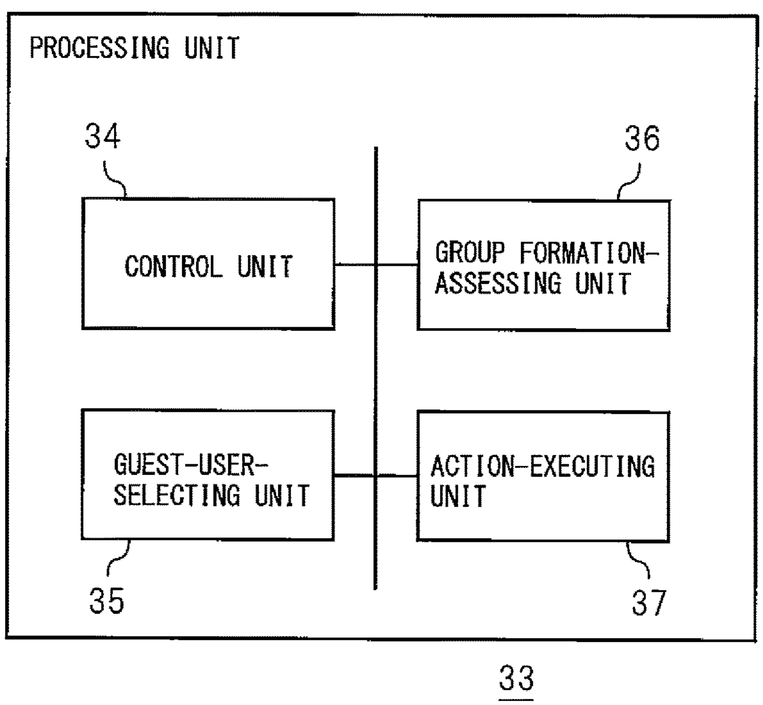
FIG. 3 is a schematic view illustrating an example of a group table.
FIG. 4 is a functional block diagram of the processing unit of the server device.

FIG. 3 is a schematic view illustrating an example of a group table. As illustrated in FIG. 3, a first column 202 of a group table 201 includes group IDs, a second column 203 includes the types of the cards belonging to each group, and a third column 204 includes the type of the robo card of each group. For example, the group table 201 specifies that the cards belonging to Group 1 are {a, b, c, d, e}, and the robo card of Group 1 is a robo card A.

It should be noted that a single card may belong to multiple groups. Moreover, the number of cards belonging to the group may differ from group to group.

The processing unit 33 includes one or multiple processors and peripheral circuits thereof. The processing unit 33 carries out the game, and performs processing for outputting the result of the game. In addition, when an enemy appears while the game is being carried out, the processing unit 33 performs the event processing.

FIG. 4 is a functional block diagram of the processing unit 33 of the server device 3. The processing unit 33 includes a control unit 34, a guest-user-selecting unit 35, a group formation-assessing unit 36, and an action-executing unit 37. Each of the units included in the processing unit 33 is a functional module implemented by a computer program to be executed by the processor included in the processing unit 33. Alternatively, each of the units included in the processing unit 33 may be provided as a firmware on the server device 3.

The control unit 34 makes the game proceed according to the programs. Moreover, the control unit 34 makes each enemy appear as the game proceeds. When an enemy appears, the control unit 34 notifies the guest-user-selecting unit 35 of the appearing of the enemy, and also notifies the group formation-assessing unit 36 of the user ID of the corresponding user.

The guest-user-selecting unit 35 selects at least one guest user. For example, the guest-user-selecting unit 35 randomly selects, as a guest user, at least one user from the users registered on the server device 3 by using a pseudo-random number generated on the basis of current time or the like. The guest-user-selecting unit 35 notifies the group formation-assessing unit 36 of the user ID of the selected guest user.

Figure 6B:
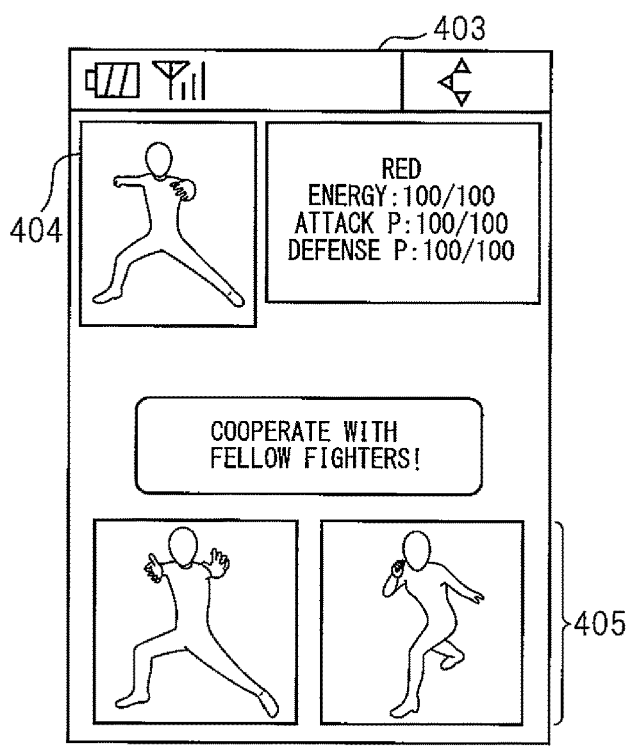
FIG. 6B is a schematic view illustrating an example of a display screen of the terminal device.

FIG. 6B illustrates a display screen 403 displayed after selection of guest users. A user 404 is displayed on an upper part of the display screen 403, while selected guest users 405 are displayed on a lower part of the screen 403.

The group formation-assessing unit 36 refers to the user table stored in the storage unit 32, and extracts the card data sets associated with the user and the guest users (the users corresponding to notified user IDs). Then, the group formation-assessing unit 36 refers to the group table stored in the storage unit 32, and determines, for each group, whether or not all the card data sets belonging to the group are included in the card data sets associated with the user and the guest users. When all the card data sets belonging to a group are included, the group formation-assessing unit 36 determines that the conditions of forming the group are satisfied. By contrast, when even a single one of the card data sets belonging to a group is missing, the group formation-assessing unit 36 determines that the conditions of forming the group are not satisfied. The group formation-assessing unit 36 notifies the action-executing unit 37 of the group ID of each formed group.

Figure 5:
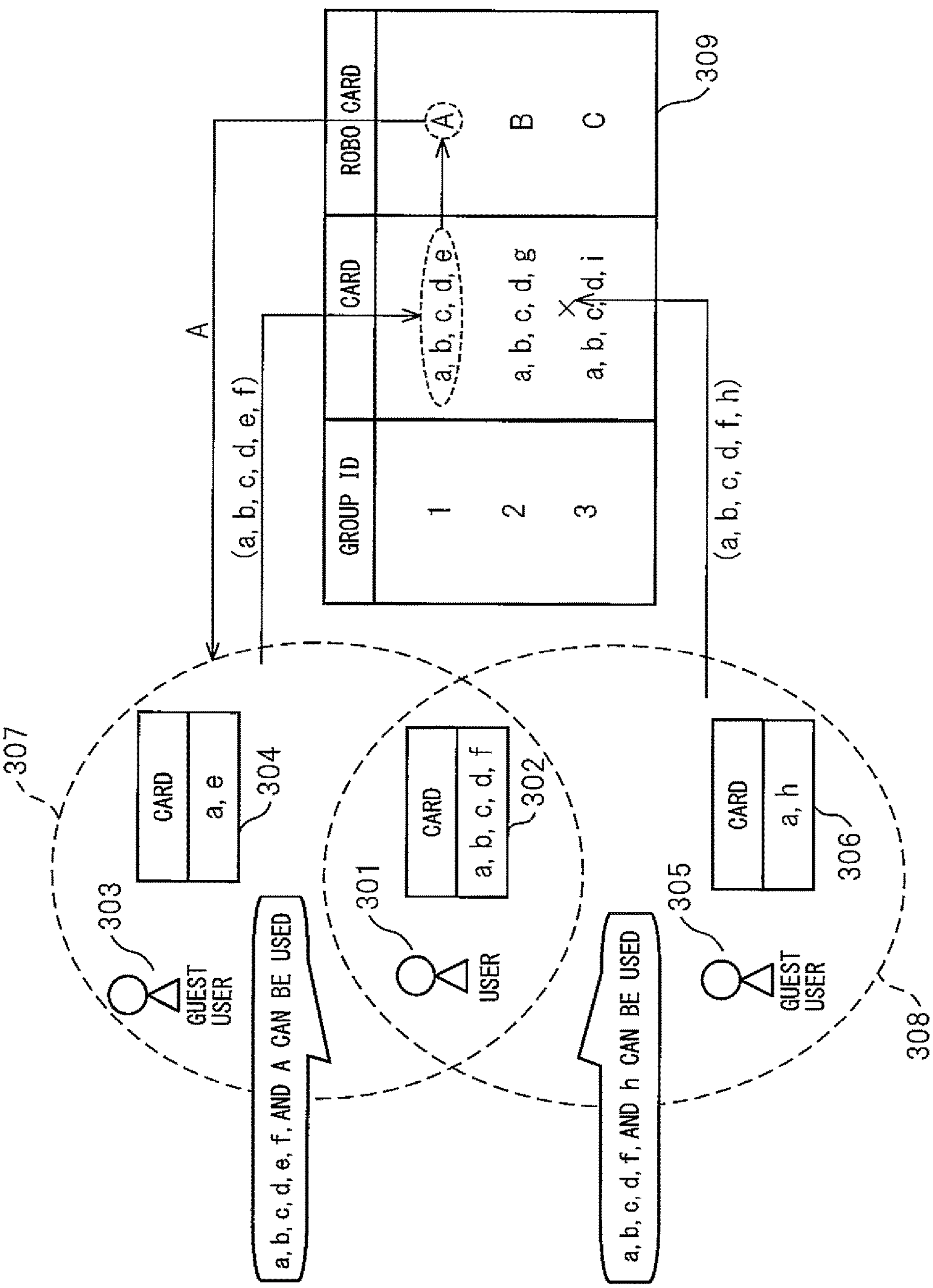
FIG. 5 is a schematic view illustrating an example of group formation-assessment processing.

FIG. 5 is a schematic view illustrating an example of group formation-assessment processing. For simplicity, in the following, assume that only one guest user is to be selected. A user 301 possesses cards {a, b, c, d, f}. In addition, a guest user 303 possesses cards {a, e}, while a guest user 305 possesses cards {a, h}. In a group table 309, Groups 1 to 3 are listed, and the combinations of cards belonging to the respective groups are {a, b, c, d, e}, {a, b, c, d, g}, and {a, b, c, d, i}.

When the guest user 303 is selected as a guest user in the above condition, the cards possessed by the user 301 are {a, b, c, d, f} and the cards possessed by the guest user 303 are {a, e}, consequently obtaining the combination of cards {a, b, c, d, e, f}. Since the combination of the cards of Group 1 {a, b, c, d, e} are included in the obtained combination, the group formation-assessing unit 36 determines that Group 1 is formed, and hence a robo card A is retrieved.

By contrast, when the guest user 305 is selected as a guest user, the cards possessed by the guest user 305 are {a, h}, consequently obtaining the combination of cards {a, b, c, d, f, h}. However, this combination does not include, for any of the groups, all the cards belonging to the group. Consequently, the group formation-assessing unit 36 determines that none of the groups is formed, and hence no robo card is retrieved.

When the group formation-assessing unit 36 determines, for any one of the groups, that the group is formed, the action-executing unit 37 refers to the group table stored in the storage unit 32, and extracts the robo card data set of the group (the group corresponding to a notified group ID). Then, the action-executing unit 37 performs the battle processing by using the robo card data set in addition to the card data sets associated with the user and the guest user. For example, the action-executing unit 37 causes damage to an enemy according to the total attack power of the card data sets.

Figure 6C:
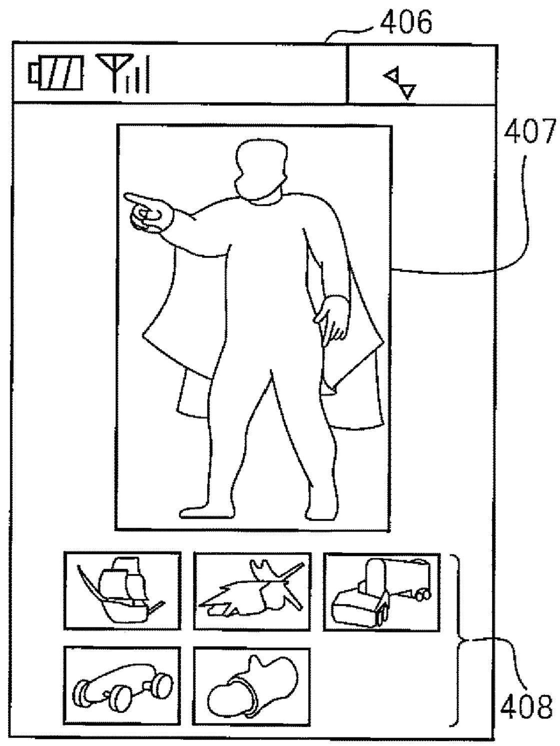
FIG. 6C is a schematic view illustrating an example of a display screen of the terminal device.
Figure 6D:
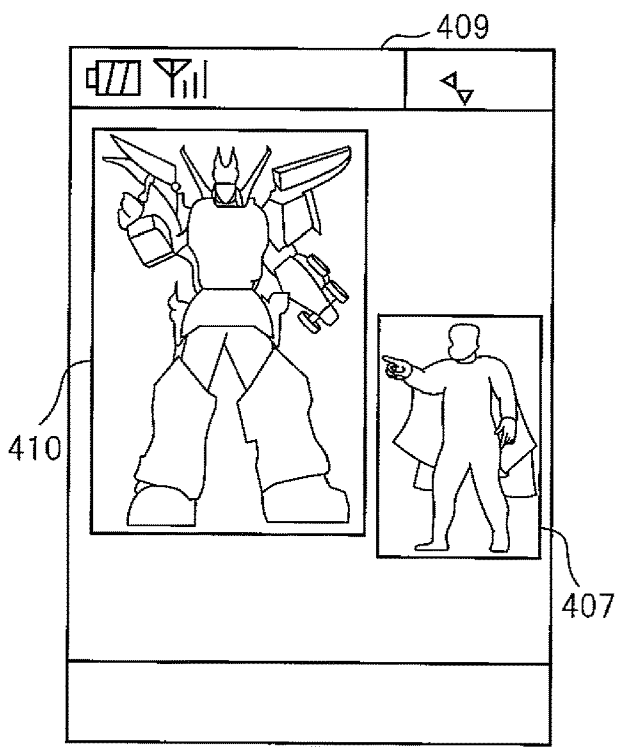
FIG. 6D is a schematic view illustrating an example of a display screen of the terminal device.

FIG. 6C illustrates a display screen 406 displayed while the battle processing is being performed. An enemy 407 is displayed on an upper part of the display screen 406, while extracted cards 408 are displayed on a lower part of the display screen 406. Moreover, when a robo card has also been extracted, the display screen 406 is switched to a display screen 409 illustrated in FIG. 6D, at predetermined timing. The enemy 407 is displayed on a right part of the display screen 409, while an extracted robo card 410 is displayed on a left part of the display screen 409.

Figure 7:
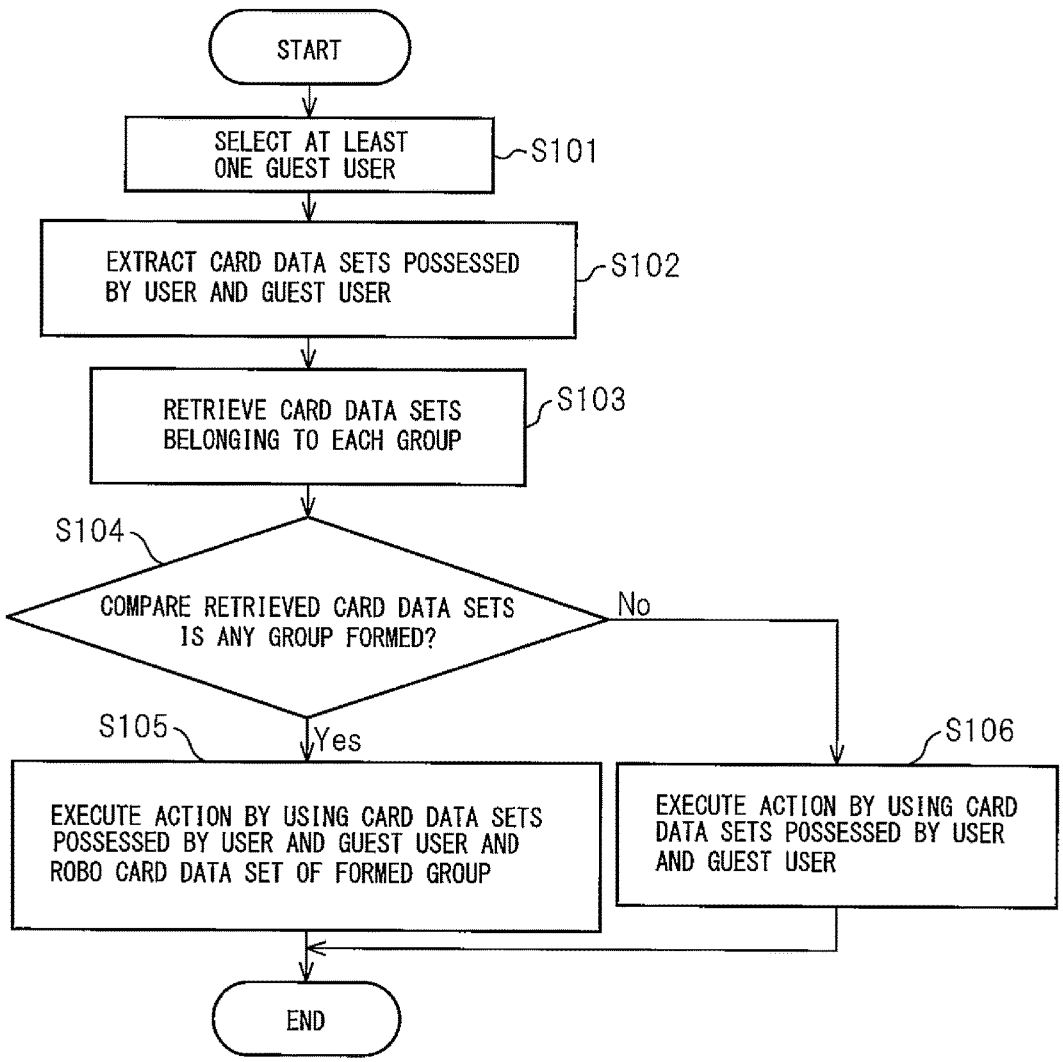
FIG. 7 is an operation flowchart of the event processing.

FIG. 7 is an operation flowchart of the event processing. The event processing is performed every time an enemy appears. The guest-user-selecting unit 35 selects at least one guest user (step S101).

The group formation-assessing unit 36 refers to the user table stored in the storage unit 32, and extracts the card data sets associated with the user and the guest user (step S102). Moreover, the group formation-assessing unit 36 refers to the group table stored in the storage unit 32, and retrieves the card data sets belonging to each group (step S103). The group formation-assessing unit 36 determines, for each group, whether or not all the card data sets belonging to the group are included in the card data sets associated with the user and the guest user (step S104).

When all the card data sets belonging to any one of the groups are included in the card data sets associated with the user and the guest user (Yes in step S104), the action-executing unit 37 refers to the group table stored in the storage unit 32, and extracts the robo card data set of the group for which the group formation-assessing unit 36 has determined that all the card data sets belonging to the group are included. Then, the action-executing unit 37 performs the battle processing by using the robo card data set in addition to the card data sets associated with the user and the guest user (step S105).

By contrast, when for each of the groups, even a single card data set among the card data sets belonging to the group is missing from the card data sets associated with the user and the guest user (No in step S104), the action-executing unit 37 performs the battle processing by using only the card data sets associated with the user and the guest user (step S106). After the battle processing is finished, the control unit 34 terminates the event processing.

As has been described above, when all the cards belonging to a certain group are included in the cards possessed by the user and the guest user at the time an enemy appears during the game, the server device according to this embodiment provides a robo card of the group. Accordingly, contribution of their cards possessed by the user and the guest user results in a synergetic effect of obtaining a robo card. In addition, a different guest user is selected every time an enemy appears, consequently changing whether a group is formed or not formed. Such features can increase the interest of the users. Along with the increase in users' interest, users' wish to participate in the game is also expected to increase.

It should be noted that, according to a modified example, the guest-user-selecting unit 35 may let the user select one or more guest users. For example, the server device 3 may transmit, to the terminal device 2, the user names of users who are in friend status with the user, and then cause the terminal device 2 to display the user names on the screen, to receive one or more selected user names from the user, and then return the one or more selected user names to the server device 3. In this case, the server device 3 preferably transmits only the user names to the terminal device 2 without transmitting the types of the cards possessed by the users, to avoid revealing whether any group is to be formed or not.

Moreover, the guest-user-selecting unit 35 may use, as identification information of each guest user, identification information other than the user name in the data relating to the guest user himself/herself. Examples of such identification information are a user ID, the combination of a user ID and a user attribute (such as the age, the gender, or the area (country) in which the user lives, having been set in the social networking service (SNS)), and the like.

Furthermore, the guest-user-selecting unit 35 may select one or more guest users by using a user attribute (such as the age, the gender, or the area (country) in which the user lives, having been set in the SNS) as a condition, instead of selecting one or more guest users randomly.

In addition, in this embodiment, description has been given that the user can use the card data sets possessed by the user himself/herself and the card data sets possessed by the guest users. However, the card data sets which the user can use are not limited to these.

For example, the following configuration may be used instead. First, each user selects, in advance, card data sets to use in a certain battle from among the card data sets possessed by the user himself/herself. The storage unit 32 stores, as a second user table, each user ID and the card data sets selected by the corresponding user in advance in association with each other. Then, the group formation-assessing unit 36 refers to the second user table stored in the storage unit 32, and determines, for each group, whether or not all the card data sets belonging to the group are included in the card data sets selected in advance by the user and the guest users.

According to such a configuration, selection of card data sets by each user made in advance in addition to selection of users as guest users affects whether any group is formed or not. Hence, users' interest can be further increased.

In addition, in this embodiment, description has been given that a robo card data set is additionally provided according to the combination of card data sets possessed by the user and the guest users. However, the card data sets with which a group has formed may be discarded, and a corresponding robo card data set may be provided instead. Note that each parameter included in the provided robo card data set is supposed to be the total of the corresponding parameters of the respective card data sets belonging to the formed combination, or a value different from the total.

Moreover, in this embodiment, description has been given that each card data set has one attribute, i.e., type. However, each card data set may include two or more attributes. Examples of such attributes may be the type and color of hero characters (occupation may be used instead of color, and concrete examples are soldier, hero, martial artist, witch, monk, and the like).

In this case, a group table is configured as illustrated in Table 1, for example. In Table 1, Groups 1 to 6 are listed. Each of Groups 1 to 5 illustrates a case of including all the colors of a particular hero character (any one of a to e), while Group 6 illustrates a case of including different hero characters (a to e) in a particular color (red). The group formation-assessing unit 36 may determine whether any group is formed on the basis of such multiple attributes included in each card data set.

TABLE 1

Group Table

| Group ID | Card | Robo card |
|---|---|---|
| 1 | (a-red)(a-blue)(a-yellow)(a-white)(a-pink) | A |
| 2 | (b-red)(b-blue)(b-green)(b-yellow)(b-pink) | B |
| 3 | (c-red)(c-black)(c-blue)(c-green)(c-yellow) | C |
| 4 | (d-red)(d-blue)(d-green)(d-brown)(d-white) | D |
| 5 | (e-red)(e-black)(e-blue)(e-purple)(e-pink) | E |
| 6 | (a-red)(b-red)(c-red)(d-red)(e-red) | F |

Furthermore, in this embodiment, description has been given of the first characteristic data by taking cards as an example. However, other kinds of game items, such as weapons, jewels, or products, for example, may be used instead.

Similarly, description has been given of the second characteristic data by taking a "robo card", which is a kind of game item, as an example. However, other kinds of game items, such as strong weapons, or items may be used instead. The second characteristic data also may be based on an act, such as a powerful trick or magic, occurring in the game, instead of a game item.

(Second Embodiment)

Figure 8:
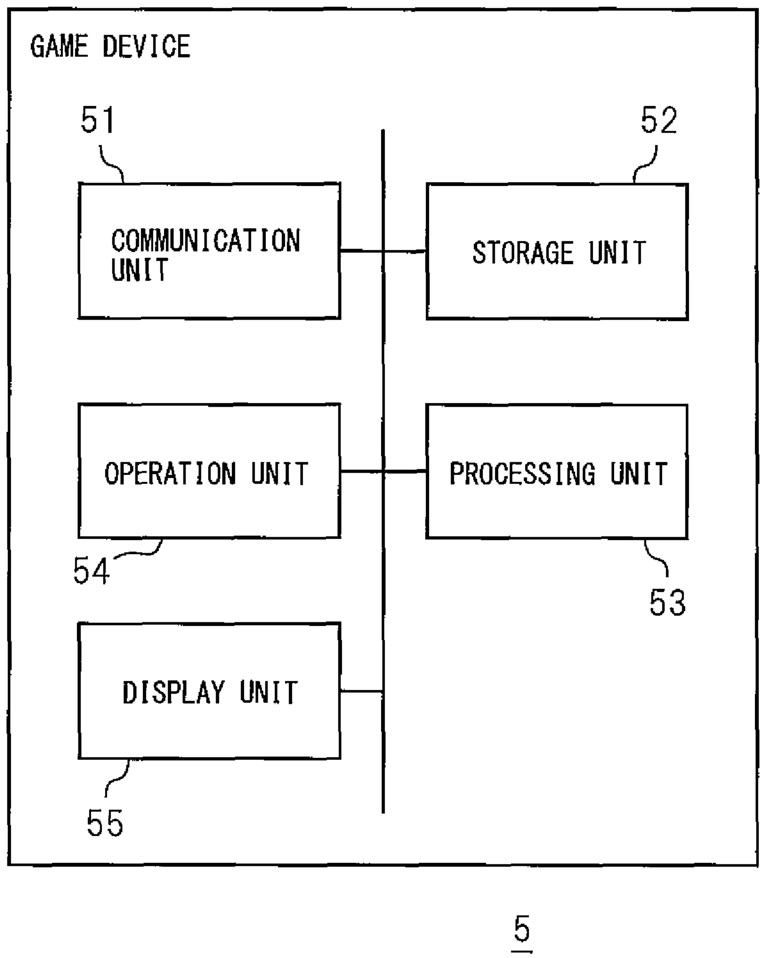
FIG. 8 is a schematic configuration diagram of a game device according to the second embodiment.

The functions of the server device according to the first embodiment can be implemented by a stand-alone game device. FIG. 8 is a schematic configuration diagram of such a game device. A game device 5 includes a communication unit 51, a storage unit 52, a processing unit 53, an operation unit 54, and a display unit 55.

The communication unit 51 includes a communication interface circuit, for communicating with a different game device 5, which is in conformity with a communication standard such as IrDA (registered trademark in Japan), Bluetooth (registered trademark in Japan), or ZigBee (registered trademark in Japan), for example. The communication unit 51 is used for exchanging card data sets with a different game device 5, for example.

The storage unit 52 and the processing unit 53 correspond to the storage unit 32 and the processing unit 33 of the server device 3 according to the first embodiment, respectively, while being different from the storage unit 32 and the processing unit 33 in that the storage unit 52 and the processing unit 53 handle the user of a different game device 5 as a guest user.

The operation unit 54 may be any device, as long as being capable of operating the game device 5, and examples are a touch pad, a keyboard, and the like. Moreover, the display unit 55 may be any device, as long as being capable of displaying a game screen, and examples are a liquid crystal display, an organic EL display, and the like.

The game device according to this embodiment has functions equivalent to those of the server device according to the first embodiment, and can produce an effect equivalent to that produced by the server device according to the first embodiment.

A computer program for causing a computer to execute the respective functions of the processing unit of the server device according to the first embodiment and the processing unit of the game device according to the second embodiment may be provided in a form recorded on a computer readable recording medium such as a magnetic recording medium or an optical recording medium.

It should be noted that the present invention is not limited to the application to a card battle game and card data, but is also applicable to other games and data which have similar structures.

It should be understood that various changes, substitutions, and modifications can be made to the present invention by those skilled in the art without departing from the spirit and scope of the present invention.

REFERENCE SIGNS LIST

1 game system
2 terminal device
3 server
31 communication unit
32 storage unit
33 processing unit
34 control unit
35 guest-user-selecting unit
36 group formation-assessing unit 37 action-executing unit
4 communication network
5 game device
51 communication unit
52 storage unit
53 processing unit
54 operation unit
55 display unit

What is claimed is:

1. A server device for carrying out a game in response to a request from a terminal device, the server device comprising:
- a memory circuit configured to
  - store, in association with each user, a first characteristic data set usable by said each user among a plurality of types of first characteristic data sets that correspond to data including a parameter indicating an ability to execute a predetermined action,
  - store a plurality of predetermined combinations of types of first characteristic data sets, each of the plurality of predetermined combinations including first characteristic data sets of at least two types of the plurality of types of first characteristic data sets, and
  - store a second characteristic data set in association with said each of the plurality of predetermined combinations, the second characteristic data set corresponding to data including a parameter indicating an ability to execute the predetermined action; and
- circuitry configured to
  - randomly select a different user who cooperates with a user of the terminal device, when a predetermined even occurs during the game, the predetermined event requiring execution of the predetermined action,
  - extract the first characteristic data sets associated with the user and first characteristic data sets associated with the different user from the memory circuit,
  - determine a combination for which all of said at least two types of the first characteristic data sets belonging to any one of the plurality of predetermined combinations are included in the extracted first characteristic data sets, extract the second characteristic data set associated with the combination for which all of said at least two types of the first characteristic data sets belonging to the combination are included, and
  - execute the predetermined action by using the second characteristic data set in addition to the first characteristic data sets associated with the user and the different user.

2. The server device according to claim 1, wherein one or a plurality of the first characteristic data sets can be possessed or selected by each user.

3. The server device according to claim 1, wherein the first characteristic data sets are managed separately from data related to each user.

4. The server device according to claim 1, wherein the first characteristic data sets are game items.

5. The server device according to claim 4, wherein the second characteristic data set is a type of an act for bringing about an advantage in executing the predetermined action, or a game item different from the game items of the first characteristic data sets.

6. The server device according to claim 1, wherein upon determining the combination, the circuitry is configured to determine a combination for which all of said at least two types of the first characteristic data sets belonging to any one of the plurality of predetermined combinations are including in both of the extracted first characteristic data sets associated with the user and the extracted first characteristic data sets associated with the different user.

7. A server control method for controlling a server device which carries out a game in response to a request from a terminal device, the server device including:
- a memory circuit configured to
  - store, in association with each user, a first characteristic data set usable by said each user among a plurality of types of first characteristic data sets that correspond to data including a parameter indicating an ability to execute a predetermined action,
  - store a plurality of predetermined combinations of types of first characteristic data sets, each of the plurality of predetermined combinations including first characteristic data sets of at least two types of the plurality of types of first characteristic data sets, and
  - store a second characteristic data set in association with said each of the plurality of predetermined combinations, the second characteristic data set corresponding to data including a parameter indicating an ability to execute the predetermined action,
  - the server control method comprising:
- randomly selecting, by circuitry of the server device a different user who cooperates with a user of the terminal device, when a predetermined event occurs during the game, the predetermined event requiring execution of the predetermined action;
- extracting, by the circuitry of the server device, the first characteristic data sets associated with the user and first characteristic data sets associated with the different user from the memory circuit;
- determining, by the circuitry of the server device, a combination for which all of said at least two types of the first characteristic data sets belonging to any one of the plurality of predetermined combinations are included in the extracted first characteristic data sets;
- extracting, by the circuitry of the server device, the second characteristic data set associated with the combination for which all of said at least two types of the first characteristic data sets belonging to the combination are included; and
- executing, by the circuitry of the server device, the predetermined action by using the second characteristic data set in addition to the first characteristic data sets associated with the user and the different user.

8. The server control method according to claim 7, wherein one or a plurality of the first characteristic data sets can be possessed or selected by each user.

9. The server control method according to claim 7, wherein the first characteristic date sets are managed separately from data related to each other.

10. The server control method according to claim 7, wherein the first characteristic data sets are game items.

11. The server control method according to claim 10, wherein the second characteristic data set is a type of an act for bringing about an advantage in executing the predetermined action, or a game item different from the game items of the first characteristic data sets.

12. The server control method according to claim 7, wherein upon determining the combination, by the circuitry of the server device, determining a combination for which all of said at least two types of the first characteristic data sets belonging to any one of the plurality of predetermined combinations are included in both of the extracted first characteristic data sets associated with the user and the extracted first characteristic data sets associated with the different user.

13. A non-transitory computer-readable recording medium having recorded thereon a server control program for controlling a server device which carries out a game in response to a request from a terminal device, the server device including:

a memory circuit configured to store, in association with each user, a first characteristic data set usable by said each user among a plurality of types of first characteristic data sets that correspond to data including a parameter indicating an ability to execute a predetermined action, store a plurality of predetermined combinations of types of first characteristic data sets, each of the plurality of predetermined combinations including first characteristic data sets of at least two types of the plurality of types of first characteristic data sets, and store a second characteristic data set in association with said each of the plurality of predetermined combinations, the second characteristic data set corresponding to data including a parameter indicating an ability to execute the predetermined action, the server control program causing the server device to execute a process comprising:

randomly selecting a different user who cooperates with a user of the terminal device, when a predetermined event occurs during the game, the predetermined event requiring execution of the predetermined action;

extracting the first characteristic data sets associated with the user and first characteristic data sets associated with the different user from the memory circuit;

determining a combination for which all of said at least two types of the first characteristic data sets belonging to any one of the plurality of predetermined combinations are included in the extracted first characteristic data sets;

extracting the second characteristic data set associated with the group for which all of said at least two types of the first characteristic data sets belonging to the combination are included; and executing the predetermined action by using the second characteristic data set in addition to the first characteristic data sets associated with the user and the different user.

14. The non-transitory computer-readable recording medium according to claim 13, wherein one or a plurality of the first characteristic data sets can be possessed or selected by each user.

15. The non-transitory computer-readable recording medium according to claim 13, wherein the first characteristic data sets are managed separately from data related to each user.

16. The non-transitory computer-readable recoding medium according to claim 13, wherein the first characteristic data sets are game items.

17. The non-transitory computer-readable recording medium according to claim 16, wherein the second characteristic data set is a type of an act for bringing about an advantage in executing the predetermined action, or a game item different from the game items of the first characteristic data sets.

18. The non-transitory computer-readable recording medium according to claim 13, wherein upon determining the combination, the server control program causing the server device to execute the process further comprises:

determining a combination for which all of said at least two types of the first characteristic data sets belonging to any one of the plurality of predetermined combinations are included in both of the extracted first characteristic data sets associated with the user and the extracted first characteristic data sets associated with the different user.

19. A terminal device for carrying out a game in response to operation of a user, the terminal device comprising:

a memory circuit configured to store, in association with each user, a first characteristic data set usable by said each user among a plurality of types of first characteristic data sets that correspond to data including a parameter indicating an ability to execute a predetermined action, store a plurality of predetermined combinations of types of first characteristic data sets, each of the plurality of predetermined combinations including first characteristic data sets of at least two types of the plurality of types of first characteristic data sets, and store a second characteristic data set in association with said each of the plurality of predetermined combinations, the second characteristic data set corresponding to data including a parameter indicating and ability to execute the predetermined action; and circuitry configured to randomly select a different user who cooperates with a user of the terminal device, when a predetermined event occurs during the game, the predetermined event requiring execution of the predetermined action, extract the first characteristic data sets associated with the user and first characteristic data sets associated with the different user from the memory circuit, determine a combination for which all of said at least two types of the first characteristic data sets belonging to any one of the plurality of predetermined combinations are included in the extracted first characteristic data sets, extract the second characteristic data set associated with the combination for which all of said at least two types of the first characteristic data sets belonging to the combination are included, and execute the predetermined action by using the second characteristic data set in addition to the first characteristic data sets associated with the user and the different user.

20. The terminal device according to claim 19, wherein one or a plurality of the first characteristic data sets can be possessed or selected by each user.

21. The terminal device according to claim 19, wherein the first characteristic data sets are managed separately from data related to each user.

22. The terminal device according to claim 19, wherein the first characteristic data sets are game items.

23. The terminal device according to claim 22, wherein the second characteristic data set is a type of an act for bringing about an advantage in executing the predetermined action, or a game item different from the game items of the first characteristic data sets.

24. The terminal device according to claim 19, wherein upon determining the combination, the circuitry is configured to determine a combination for which all of said at least two types of the first characteristic data sets belonging to any one of the plurality of predetermined combinations are included in both of the extracted first characteristic data sets associated with the user and the extracted first characteristic data sets associated with the different user.

25. A terminal control method for controlling a terminal device which carries out a game in response to operation of a user, the terminal device including:

a memory circuit configured to store, in association with each user, a first characteristic data set usable by said each user among a plurality of types of first characteristic data sets that correspond to data including a parameter indicating an ability to execute a predetermined action, store a plurality of predetermined combinations of types of first characteristic data sets, each of the plurality of predetermined combinations including first characteristic data sets of at least two types of the plurality of types of first characteristic data sets, and store a second characteristic data set in association with said each of the plurality of predetermined combinations, the second characteristic data set corresponding to data including a parameter indicating an ability to execute the predetermined action, the terminal control method comprising:

randomly selecting, by circuitry of the terminal device, a different user who cooperates with a user of the terminal device, when a predetermined event occurs during the game, the predetermined event requiring execution of the predetermined action;

extracting the first characteristic data sets associated with the user and first characteristic data sets associated with the different user, by the circuitry of the terminal device and from the memory circuit;

determining, by the circuitry of the terminal device, a combination for which all of said at least two types of the first characteristic data sets belonging to any one of the plurality of predetermined combinations are included in the extracted first characteristic data sets;

extracting, by the circuitry of the terminal device, the second characteristic data set associated with the combination for which all of said at least two types of the first characteristic data sets belonging to the combination are included; and executing the predetermined action by using the second characteristic data set in addition to the first characteristic data sets associated with the user and the different user.

26. The terminal control method according to claim 25, wherein one or a plurality of the first characteristic data sets can be possessed or selected by each user.

27. The terminal control method according to claim 25, wherein the first characteristic data sets are managed separately from data related to each user.

28. The terminal control method according to claim 25, wherein the first characteristic data sets are game items.

29. The terminal control method according to claim 28, wherein the second characteristic data set is a type of an act for bringing about an advantage in executing the predetermined action, or a game item different from the game items of the first characteristic data sets.

30. The terminal control method according to claim 25, wherein upon determining the combination, by the circuitry of the server device, determining a combination for which all of said at least two types of the first characteristic data sets belonging to any one of the plurality of predetermined combinations are included in both of the extracted first characteristic data sets associated with the user and the extracted first characteristic data sets associated with the different user.

31. A non-transitory computer-readable recording medium having recorded thereon a terminal control program for controlling a terminal device which carries out a game in response to operation of a user, the terminal device including a memory circuit configured to store, in association with each user, a first characteristic data set usable by said each user among a plurality of types of first characteristic data sets that correspond to data including a parameter indicating an ability to execute a predetermined action, store a plurality of predetermined combinations of types of first characteristic data sets, each of the plurality of predetermined combinations including first characteristic data sets of at least two types of the plurality of types of first characteristic data sets, and store a second characteristic data set in association with said each of the plurality of predetermined combinations, the second characteristic data set corresponding to data including a parameter indicating an ability to execute the predetermined action, the terminal control program causing the terminal device to execute a process comprising:

randomly selecting a different user who cooperates with a user of the terminal device, when a predetermined event occurs during the game, the predetermined event requiring execution of the predetermined action;

extracting the first characteristic data sets associated with the user and first characteristic data sets associated with the different user from the memory circuit;

determining a combination for which all of said at least two types of the first characteristic data sets belonging to any one of the plurality of predetermined combinations are included in the extracted first characteristic data sets;

extracting the second characteristic data set associated with the group for which all of said at least two types of the first characteristic data sets belonging to the combination are included; and executing the predetermined action by using the second characteristic data set in addition to the first characteristic data sets associated with the user and the different user.

32. The non-transitory computer-readable recording medium according to claim 31, wherein one or a plurality of the first characteristic data sets can be possessed or selected by each user.

33. The non-transitory computer-readable recording medium according to claim 31, wherein the first characteristic data sets are managed separately from data related to each user.

34. The non-transitory computer-readable recording medium according to claim 31, wherein the first characteristic data sets are game items.

35. The non-transitory computer-readable recording medium according to claim 34, wherein the second characteristic data set is a type of an act for bringing about an advantage in executing the predetermined action, or a game item different from the game items of the first characteristic data sets.

36. The non-transitory computer-readable recording medium according to claim 31, wherein upon determining the combination, the terminal control program causing the terminal device to execute the process further comprises:

determining a combination for which all of said at least two types of the first characteristic data sets belonging to any one of the plurality of predetermined combinations are included in both of the extracted first characteristic data sets associated with the user and the extracted first characteristic data sets associated with the different user.

* * * * *